(12) United States Patent
Inayoshi et al.

(10) Patent No.: US 8,384,530 B2
(45) Date of Patent: Feb. 26, 2013

(54) SEAT OCCUPANT DETERMINING APPARATUS

(75) Inventors: Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 190 days.

(21) Appl. No.: 12/891,053

(22) Filed: Sep. 27, 2010

(65) Prior Publication Data

US 2011/0095580 A1    Apr. 28, 2011

(30) Foreign Application Priority Data

Oct. 22, 2009    (JP) .................................. 2009-243233

(51) Int. Cl.
*B60Q 1/00*    (2006.01)
*G08B 21/00*    (2006.01)
*B60K 28/00*    (2006.01)

(52) U.S. Cl. ...................... 340/425.5; 340/665; 340/666; 340/667; 701/45; 200/85 A; 180/273; 180/290

(58) Field of Classification Search ............... 340/425.5, 340/667; 200/85 A; 180/273
See application file for complete search history.

(56) References Cited

U.S. PATENT DOCUMENTS

| | | | |
|---|---|---|---|
| 7,009,509 B2 * | 3/2006 | Sakai | 340/457.1 |
| 7,135,645 B2 * | 11/2006 | Hiraki et al. | 177/25.13 |
| 7,478,699 B2 * | 1/2009 | Kobayashi et al. | 180/273 |
| 7,786,882 B2 * | 8/2010 | Okawa | 340/667 |
| 2004/0016577 A1 * | 1/2004 | Lichtinger et al. | 177/144 |
| 2011/0005843 A1 | 1/2011 | Ito et al. | |
| 2011/0010037 A1 | 1/2011 | Inayoshi et al. | |
| 2011/0010038 A1 | 1/2011 | Inayoshi et al. | |
| 2011/0010039 A1 | 1/2011 | Inayoshi et al. | |
| 2011/0010056 A1 | 1/2011 | Inayoshi et al. | |
| 2011/0010109 A1 | 1/2011 | Ito et al. | |
| 2011/0012402 A1 | 1/2011 | Inayoshi et al. | |
| 2011/0043009 A1 | 2/2011 | Inayoshi et al. | |
| 2011/0094317 A1 | 4/2011 | Aoyama et al. | |
| 2011/0098891 A1 | 4/2011 | Inayoshi et al. | |

FOREIGN PATENT DOCUMENTS

| | | |
|---|---|---|
| JP | 9-207638 A | 8/1997 |
| JP | 3991740 B2 | 10/2007 |

* cited by examiner

*Primary Examiner* — Donnie Crosland
(74) *Attorney, Agent, or Firm* — Buchanan Ingersoll & Rooney PC

(57) ABSTRACT

A seat occupant determining apparatus includes a first load detecting sensor at a right of a seat, a second load detecting sensor at a left of the seat, a third load detecting sensor at a front or a rear of the first and second load detecting sensors, in order to detect a part of the load, respectively, a right-left sum value calculating portion calculating a right-left sum value, a threshold changing portion for changing an occupant determining threshold on the basis of the load value of the third load detecting sensor, and an occupant determining portion determining an occupant of the seat to be an adult when the right-left sum value is equal to or more than the occupant determining threshold and determining an occupant of the seat to be a child in a child seat when the right-left sum value is less than the occupant determining threshold.

20 Claims, 8 Drawing Sheets

SEAT OCCUPANT DETERMINING APPARATUS

CROSS REFERENCE TO RELATED APPLICATIONS

This application is based on and claims priority under 35 U.S.C. §119 to Japanese Patent Application 2009-243233, filed on Oct. 22, 2009, the entire content of which is incorporated herein by reference.

TECHNICAL FIELD

This disclosure relates to a seat occupant determining apparatus for determining an occupant of a vehicle seat as an adult or a child.

BACKGROUND DISCUSSION

In order to improve a level of performance of a safety equipment such as a seatbelt, an air-bag or the like, an actuation of the safety equipment may be controlled in accordance with a weight of a passenger sitting on a vehicle seat to which the safety equipment is provided. For example, when a passenger sitting on the seat does not fasten the seat belt, the passenger is generally notified of not wearing the seat belt by an alarm or warning. The law in the United States states that, when an adult is sitting on a passenger seat, an air-bag must be deployed in the event of a vehicle collision or the like. On the other hand, the law also states that, when a passenger such as a baby or a child is placed in a child seat fixed on the passenger seat in a manner where the occupant of the child seat faces the seat back of the passenger seat, the air-bag must not be deployed because an impact caused by the deployed air-bag may cause damage to the occupant of the child seat in the event of a car accident. A determination that the passenger sitting on the passenger seat is an adult, is executed on the basis of a value of a weight of an adult female whose weight is relatively light and height is relatively low. A determination that the passenger sitting on the passenger seat is a child, is executed on the basis of a suitable basis. Thus, in view of safety matter, it is important to determine a type of passenger on the basis of a weight of the passenger.

Disclosed in JPH9-207638A is an occupant detecting apparatus for determining an existence of an occupant of a seat by detecting a load acting on the seat. The occupant detecting apparatus includes two load sensors that are provided at two of four seat attaching portions, and the existence of the occupant is determined on the basis of a total of load value detected by the two load sensors. Accordingly, the occupant detecting apparatus includes the load sensors provided at two of four seat attaching portions, where the two portions are a necessary minimum to determine the existence of the occupant of the seat, thereby achieving a simple configuration and low cost occupant detecting apparatus.

Further, disclosed in JP3991740B is an occupant detecting apparatus for determining whether an occupant sitting on the seat is an adult or a child. The occupant detecting apparatus includes first and second load sensors for respectively detecting a load applied to the seat in the vicinity of the buckle of a seat belt and a load applied to the seat at a portion opposite to the buckle of the seat belt, detecting means for detecting an insertion of a tongue plate into the buckle, determining portion for determining the occupant to be an adult in a case where a total of the load values detected by the first and second load sensors are equal to or more than a threshold that is set in advance. Further, the determining portion determines the occupant to be a child in a case where, even when the total of the load values is equal to or more than the threshold, a difference between the load value detected by the first load sensor and the load value detected by the second load sensor has increased to be a predetermined value or more, and the load value detected by the first load sensor has increased before and after a timing where the tongue plate is inserted into the buckle. In this configuration, an error in determination may be reduced, the error would happen in a case where a child whose weight is slightly lower than a threshold sits on the seat, and the seat belt is fasten by other passenger. According to the description of the JP3991740B, the occupant detecting apparatus includes two first load sensors and two second load sensors at four seat attaching portions, so that a total load may be calculated on the basis of the load values detected at four seat attaching portions (all of the seat attaching portions).

According to the occupant detecting apparatus disclosed in JPH9-207638A, the apparatus determines the existence of the occupant of the seat, however, because the apparatus includes a minimum number of the load sensors in view of achieving a cost reduction and a weight reduction, the apparatus may not be able to determine whether an occupant is an adult or a child.

As is the configuration of the occupant detecting apparatus disclosed in JPH9-207638A, where the load sensors are not provided at all of the seat attaching portions and provided at only two of the seat attaching portions, because the load value detected by the load sensor may change depending on a height of a seating surface of the seat and a vehicle tilt angle, a difficulty exists in determining whether the occupant is an adult or a child on the basis of the set threshold. Further, in a case where the seat includes a lifter by which the height of the seating surface of the seat is adjusted upwardly or downwardly, the load value detected by the load sensor may vary depending on the height of the lifter; accordingly a further difficulty exists in determining whether the occupant is an adult or a child.

According to the occupant detecting apparatus disclosed in JP3991740B, although the determination whether the occupant is an adult or a child (an infant) is executed with high accuracy by eliminating the effect of the load value temporally increasing at the time of the seatbelt fastening operation, because the apparatus includes four load sensors provided at four seat attaching portions, a cost and a weight of the apparatus would be increased.

A need thus exists to provide a seat occupant determining apparatus, which is not susceptible to the drawback mentioned above.

SUMMARY

According to an aspect of this disclosure, a seat occupant determining apparatus of a seat adapted to a vehicle includes a first load detecting sensor provided at a right portion of the seat in a seat width direction and at a lower portion of the seat in a seat height direction in order to detect a part of a load acting on the seat and a second load detecting sensor provided at a left portion of the seat in the seat width direction and at a lower portion of the seat in the seat height direction in order to detect a part of the load acting on the seat, where the seat has a seat back and the seat width direction corresponds to a width direction of the seat back, a third load detecting sensor provided so as to be distant from the first and second load detecting sensors in a front or a rear direction of the seat in order to detect a part of the load acting on the seat, a right-left sum value calculating portion calculating a right-left sum value by adding a first load value detected by the first load detecting sensor and a second load value detected by the second load detecting sensor, a threshold changing portion for changing an occupant determining threshold on the basis of a third load value detected by the third load detecting sensor and an occupant determining portion determining an occupant of the seat to be an adult when the right-left sum value is equal to or more than the occupant determining threshold and determining an occupant of the seat to be a child placed in a child seat that is fixed to the seat when the right-left sum value is less than the occupant determining threshold.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
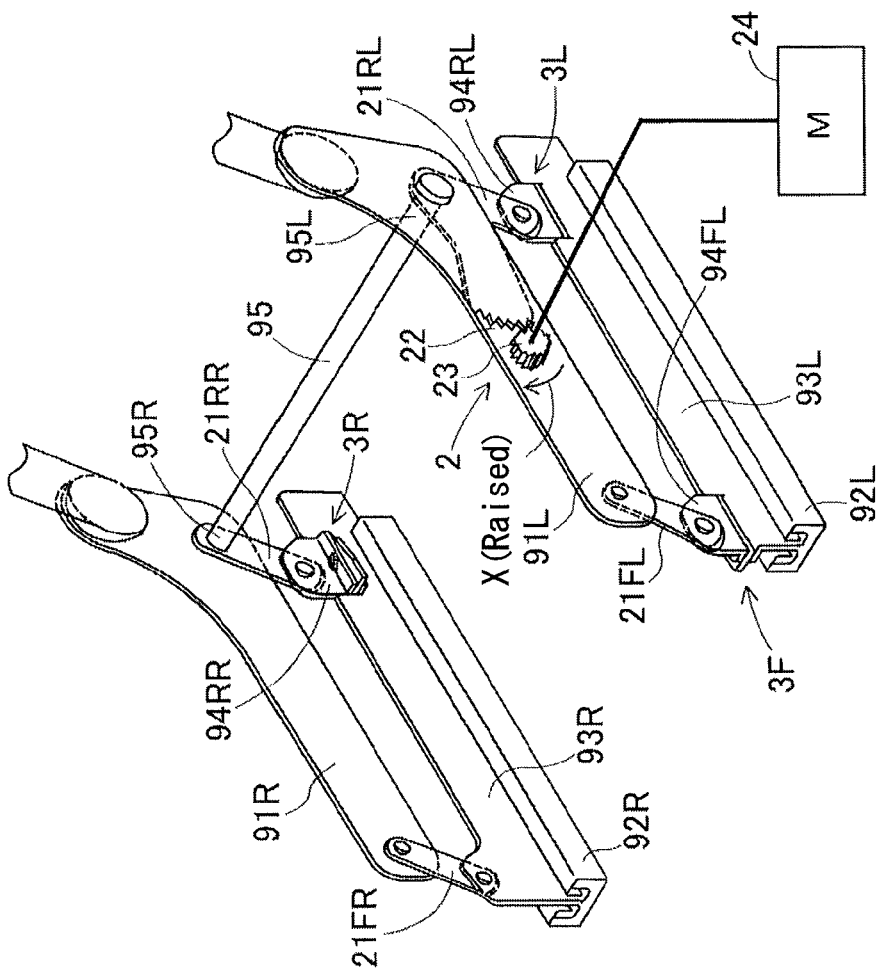
FIG. 1 illustrates an oblique perspective view indicating a lower portion of an inside of a passenger seat to which a seat occupant determining apparatus related to a first embodiment of this disclosure is provided.

Embodiments of this disclosure will be explained with reference to FIGS. 1 through 4. FIG. 1 is an oblique perspective view indicating a lower portion of inside of a passenger seat (hereinafter referred to as a seat) to which a seat occupant determining apparatus 1 of the first embodiment of this disclosure is applied. Hereinafter, "front of the seat" indicates the front of an occupant sitting on the seat, "right of the seat" indicates the right side of the occupant sitting on the seat, and "left of the seat" indicates the left side of the occupant sitting on the seat.

As indicated in FIG. 1, a right side frame 91R and a left side frame 91L, forming a cushion frame of the seat, are provided at a lower portion of the cushion frame of the seat so as to extend in a front-rear direction of the seat. The right side frame 91R is connected to the left side frame 91L at rear portions thereof by means of a connecting rod 95 that is provided so as to extend between the rear portion of the right side frame 91R and the rear portion of the left side frame 91L. Specifically, the right side frame 91R is rotatably supported by the connecting rod 95 at a right end portion 95R thereof, and the left side frame 91L is rotatably supported by the connecting rod 95 at a left end portion 95L thereof, so that the right and left side frames 91R and 91L are supported by the connecting rod 95 in a manner where a distance therebetween is maintained. A slide mechanism by which the seat is moved in the front-rear direction is provided at the lower portion of the seat. The slide mechanism includes a right lower rail 92R, a left lower rail 92L, a right upper rail 93R and a left upper rail 93L. Specifically, The right and left lower rails 92R and 92L are fixed on a vehicle floor so as to extend in the front-rear direction of the seat, and the right upper rail 93R is engaged with the right lower rail 92R in the front-rear direction of the seat, and the left upper rail 93L is engaged with the left lower rail 92L so as to slide in the front-rear direction of the seat. A lifter 2 for moving the seat up and down is provided between the right side frame 91R and the right upper rail 93R and between the left side frame 91L and the left upper rail 93L.

The lifter 2 is configured by links 21FL, 21FR, 21RL and 21RR. The link 21FR (e.g., the front right link 21FR) connects the right upper rail 93R to the right side frame 91R at the front portions of the right upper rail 93R and the right side frame 91R, the link 21RR (e.g., the rear right link 21RR) connects the right upper rail 93R to the right side frame 91R at the rear portions of the right upper rail 93R and the right side frame 91R, the link 21FL (e.g., the front left link 21FL) connects the left upper rail 93L to the left side frame 91L at the front portions of the left upper rail 93L and the left side frame 91L, and the link 21RL (e.g., the rear left link 21RL) connects the left upper rail 93L to the left side frame 91L at the rear portions of the left upper rail 93L and the left side frame 91L. The links 21FL, 21FR, 21RL and 21RR serve as four supporting portions at which the seat is supported. Specifically, the links 21FL, 21FR, 21RL and 21RR support a load of the occupant acting on the seat and a weight of the seat itself in such a way that each of the links 21FL, 21FR, 21RL and 21RR share the load and the weight acting on the seat. The front right link 21FR is rotatably connected to the front portion of the right side frame 91R and the front portion of the right upper rail 93R, and the front left link 21FL is rotatably connected to the front portion of the left side frame 91L and a retainer 94FL. One end of the rear right link 21RR is rotatably connected to a retainer 94RR, and the other end of the rear right link 21RR is fixed to the right end portion 95R of the connecting rod 95 by welding or the like.

The rear left link 21RL is formed in an approximately V-shape, which is configured by two elongated portions, first and second elongated portions, and a base portion connecting the elongated portions so as to form a shape of a letter "V". The rear left link 21RL is fixed at the base portion thereof to the left end portion 95L of the connecting rod 95 by welding or the like. The first elongated portion is rotatably connected to a retainer 94RL. Thus, a rigid lifting component is configured by the rear right link 21RR, the rear left link 21RL and the connecting rod 95 so as to be integrally. The rear left link 21RL is arranged in such a way that the second elongated portion extends in a front direction of the seat, and a gear tooth portion 22 is formed at a front edge of the second elongate portions, and further a pinion gear 23 meshing with the gear tooth portion 22 is rotatably provided on an inner side of the left side frame 91L. The pinion gear 23 is rotated by an electric motor 24 that is provided at the left side frame 91L.

Two flange portions are formed at an upper end of the upper rail 93L, and one flange portion is formed at an upper end of the upper rail 93R. Each of the flange portions is formed by bending inwardly so as to correspond to each of the retainers 94FL, 94RL and 94RR. In this configuration, a front load detecting sensor 3F is provided so as to connect the retainer 94FL to the flange portion formed at the front portion of the upper rail 93L and so as to detect a load thereat, a rear left load detecting sensor 3L is provided so as to connect the retainer 94RL to the flange portion formed at the rear portion of the upper rail 93L and so as to detect a load thereat, and a rear right load detecting sensor 3R is provided so as to connect the retainer 94RR to the flange portion formed at the upper rail 93R and so as to detect a load thereat. In this configuration, at the right of the seat, a deformable rectangular shaped link mechanism is formed by the right side frame 91R, the right upper rail 93R, the front right link 21FR and the rear right link 21RR, and at the left of the seat, a deformable rectangular shaped link mechanism is formed by the left side frame 91L, the left upper rail 93L, the front left link 21FL and the rear left link 21RL.

In this configuration, once the lifter 2 is operated by turning on the electric motor 24, the seat is moved up or down. Specifically, the pinion gear 23 is rotated by the electric motor 24 in a clockwise direction indicated by an arrow X, the gear tooth portion 22 of the rear left link 21RL is moved downwardly, and the rear left link 21RL is rotated in an anticlockwise direction relative to the retainer 94RL. Accordingly, the central portion of the rear left link 21RL is raised in a forward-upper direction. Thus, by virtue of the actuation of the rectangular shaped link mechanism, the left side frame 91L is raised in the forward-upper direction by keeping a horizontal level. Further, because the rear right link 21RR is connected to the rear left link 21RL by means of the connecting rod 95, the rear right link 21RR is moved integrally with the rear left link 21RL, accordingly, the right side frame 91R is also raised in the forward-upper direction by keeping a horizontal level. In accordance with the right and left side frames 91R and 91L rising in the forward-upper direction, the seat is lifted in the forward-upper direction by keeping a horizontal level. A lifter height H of the lifter 2 is regulated so as not to exceed an upper limit height UM by means of a stopper.

On the other hand, once the pinion gear 23 is rotated in an anticlockwise direction, the gear tooth portion 22 of the rear left link 21RL is moved upwardly, and the rear left link 21RL is rotated in a clockwise direction relative to the retainer 94RL. Accordingly, the central portion of the rear left link 21RL is lowered in a rear-lower direction. Thus, by virtue of the actuation of the rectangular shaped link mechanism, the left side frame 91L is lowered in the rear-lower direction with keeping its posture horizontally. Further, the right side frame 91R connected by the connecting rod 95 is also lowered in the rear-lower direction by keeping a horizontal level so as to follow the actuation of the rear left link 21RL. In accordance with the right and left side frames 91R and 91L lowering in the rear-lower direction, the seat is also lowered in the rear-lower direction by keeping a horizontal level. The lifter height H of the lifter 2 is regulated so as not to exceed a lower limit height LM by means of a stopper.

Figure 2A:
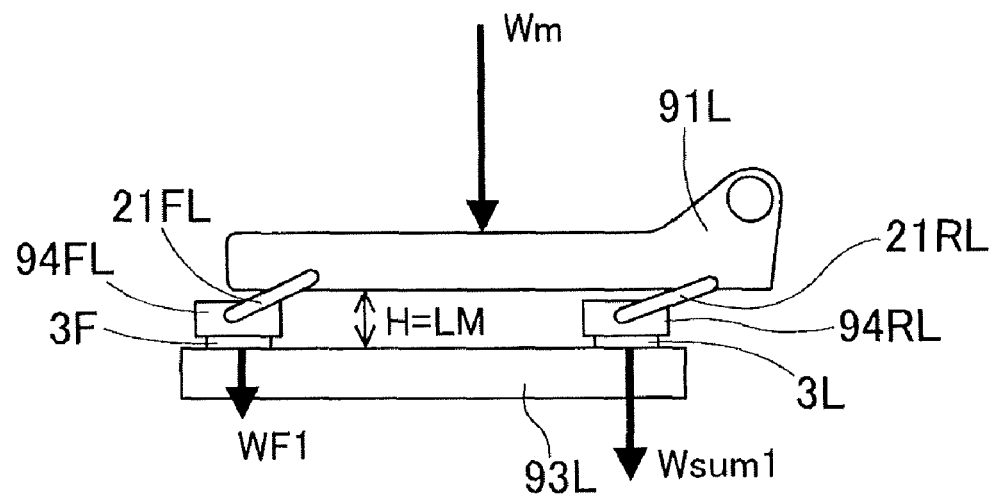
FIG. 2A illustrates a side view for explaining a state where the seat is moved down to a lower limit by means of a lifter in the first embodiment.
Figure 2B:
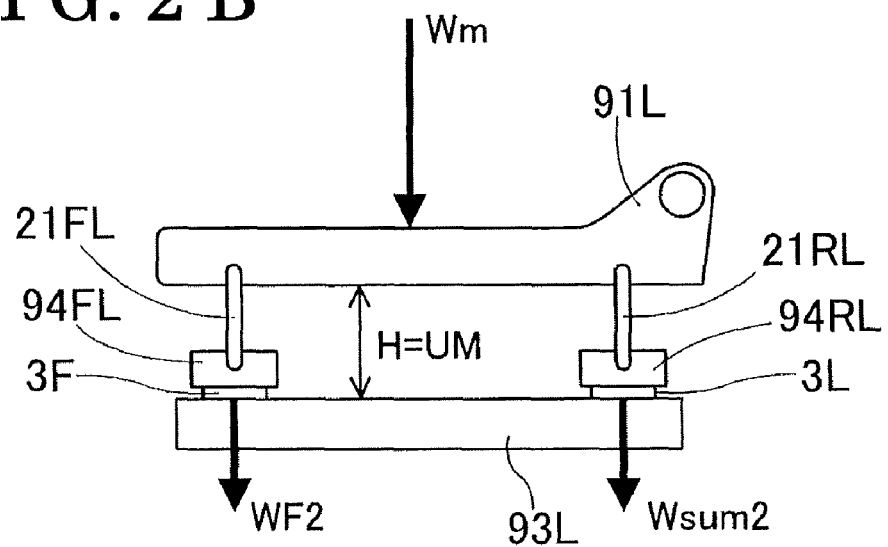
FIG. 2B illustrates a side view for explaining a state where the seat is moved up to an upper limit by means of the lifter in the first embodiment.

FIGS. 2A and 2B are side views for explaining a state where the seat is moved up and down by means of the lifter 2 according to the first embodiment. FIG. 2A indicates a state where the lifter height H reaches the lower limit height LM, and FIG. 2B indicates a state where the lifter height H reaches the upper limit height UM. The lifter height H is determined by a distance between the left side frame 91L and the upper rail 93L. As indicated in the drawings, as the link mechanism is actuated in such a way that the lifter height H is changed from the lower limit height LM toward the upper limit height UM, the left side frame 91L is not only raised but also is moved forward. Accordingly, as the lifter height H increases, a position where an occupant's load Wm is intensively placed (e.g., the rear portion of the seat) is gradually moved toward the front portion of the seat.

Figure 3:
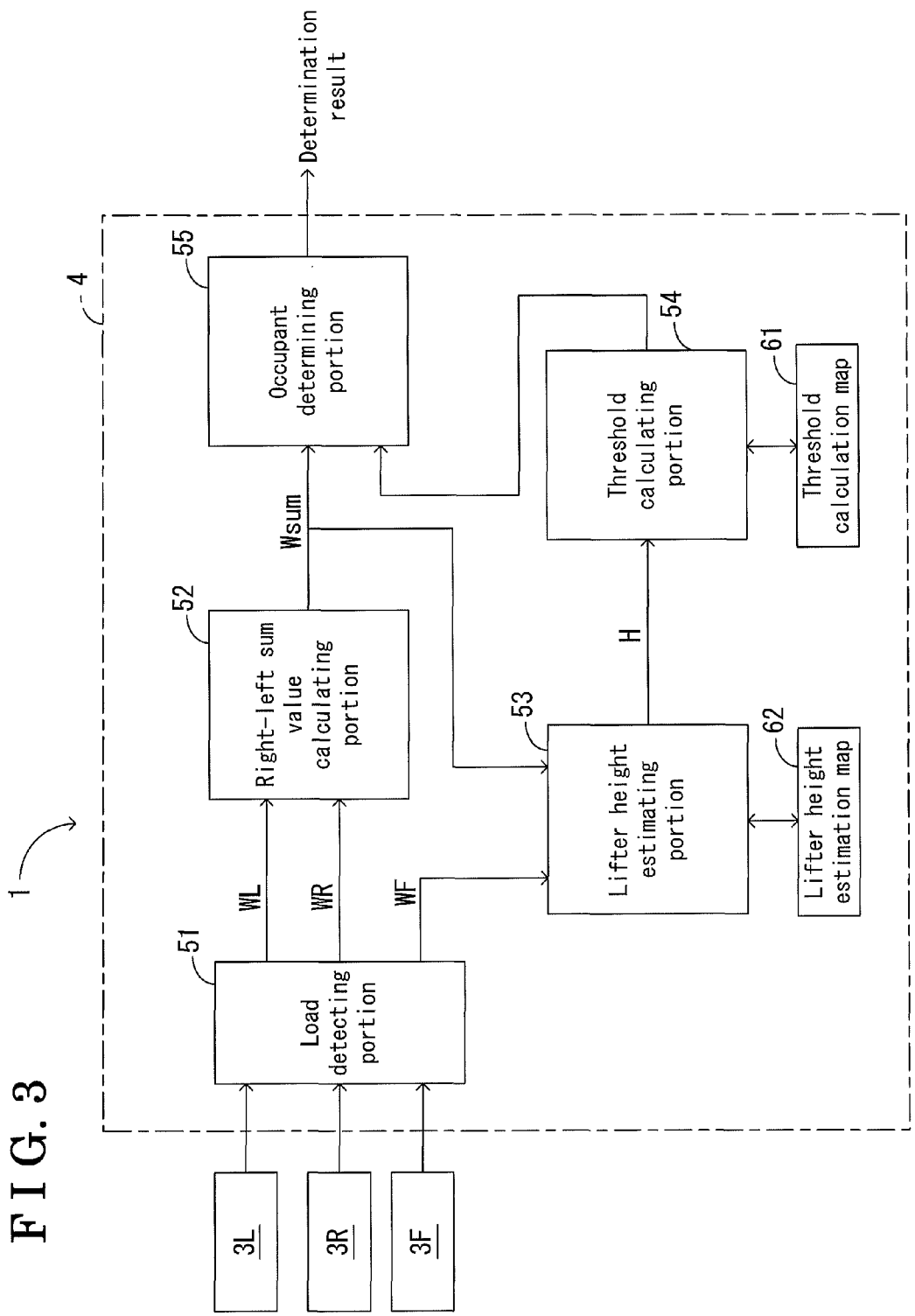
FIG. 3 illustrates a block diagram indicating a configuration of the seat occupant determining apparatus of the first embodiment.

A configuration of the seat occupant determining apparatus 1 is explained with reference to FIG. 3. FIG. 3 is a block diagram for explaining the configuration of the seat occupant determining apparatus 1 of the first embodiment. As indicated in FIG. 3, the seat occupant determining apparatus 1 is configured mainly by the rear left load detecting sensor 3L, the rear right load detecting sensor 3R, the front load detecting sensor 3F and a load detection ECU 4.

The rear left load detecting sensor 3L detects a load acting on the rear left link 21RL in FIG. 1, which is the rear left load value WL, the rear right load detecting sensor 3R detects a load acting on the rear right link 21RR in FIG. 1, which is the rear right load value WR, and the load detecting sensor 3F detects a load acting on the front left link 21FL in FIG. 1, which is the front load value WF. Each of the rear left load value WL, the rear right load value WR and the front load value WF is a part of the load acting on the seat. The rear left load detecting sensor 3L corresponds to a first load detecting sensor provided at the lower left of the seat, and the rear right load detecting sensor 3R corresponds to a second load detecting sensor provided at the lower right of the seat, where the first and second load detecting sensor are provided so as to be distant from each other in a width direction of the seat. The rear left load value WL detected by the rear left load detecting sensor 3L corresponds to a first load value, and the rear right load value WR detected by the rear right load detecting sensor 3R corresponds to a second load value. The front load detecting sensor 3F corresponds to a third load detecting sensor provided at the front of the first and second load detecting sensors so as to be distant from each other. A front load value WF detected by the front load detecting sensor 3F corresponds to a third load value. Each of the load detecting sensors 3L, 3R and 3F is configured by a strain gauge type sensor, and an electric power output of each sensor is transmitted to a load detecting portion 51 of the load detection ECU 4. Each of the load detecting sensors 3L, 3R and 3F is initialized so as to output a load value of zero when the seat is in a standard state. The standard state of the seat is established when the vehicle is located on a horizontal ground, and no occupant is placed on the seat, in other words, only a weight of the seat itself acts on the seat. In this configuration, the sensors may detect only the occupant's load Wm acting on the seat and may not detect the weight of the seat itself.

Each of the rear left load value WL, the rear right load value WR and the front load value WF detected by the load detecting sensors 3L, 3R and 3F, respectively, changes on the basis of the occupant's load Wm and changes depending on the lifter height H of the lifter 2. As indicated in FIG. 2A, when the lifter 2 is moved so as to reach the lower limit height LM, the occupant's load Wm is intensively placed at the rear of the seat, and as the front load value WF1 decreases, the rear left load value WL and the rear right load value WR increase, accordingly a right-left sum value Wsum1 increases. On the other hand, as indicated in FIG. 2B, when the lifter 2 is moved so as to reach the upper limit height UM, the occupant's load Wm is intensively placed at the front of the seat, and as the front load value WF2 increases, the rear left load value WL and the rear right load value WR decreases, accordingly a right-left sum value Wsum2 decreases.

As mentioned in FIG. 3, the load detection ECU 4 is an electronic control unit including a calculating portion, a memorizing portion, an input portion, an output portion and is operated by executing software. Each functional means such as the load detecting portion 51, a right-left sum value calculating portion 52, a lifter height estimating portion 53, a threshold calculating portion 54 and an occupant determining portion 55 is achieved by software as a main component. A threshold calculation map 61 and a lifter height estimation map 62 are data memorized in the memorizing portion.

The load detecting portion 51 is provided at the input portion of the load detection ECU 4 and includes an A/D converter in order to convert an analog electric output from each of the load detecting sensors 3L, 3R and 3F into a digital output. Further, the load detecting portion 51 calculates the rear left load value WL, the rear right load value WR and the front load value WF in an engineering unit by use of a predetermined engineering conversion equation and outputs those values. The right-left sum value calculating portion 52 calculates a right-left sum value Wsum by adding the rear left load value WL to the rear right load value WR, which are obtained from the load detecting portion 51.

The lifter height estimating portion 53 calculates a front-to-rear ratio that indicates a ratio between the front load value WF obtained from the load detecting portion 51 and the right-left sum value Wsum obtained from the right-left sum value calculating portion 52 (f/r=WF/Wsum). Then, the front-to-rear ratio (f/r) is checked with the lifter height estimation map 62 to estimate the lifter height H. The lifter height estimation map 62 is data indicating relationships between the front-to-rear ratios and the lifter heights H, which are observation results, in a correspondence table format.

The threshold calculating portion 54 checks the lifter height H obtained from the lifter height estimating portion 53 with the threshold calculation map 61 in order to obtain an occupant determining threshold JD. The threshold calculation map 61 is data indicating relationships between the lifter heights H and the occupant determining thresholds JD, which are observation results, in a correspondence table format. The threshold changing portion is configured by the lifter height estimating portion 53 and the threshold calculating portion 54.

The occupant determining portion 55 compares the right-left sum value Wsum obtained from the right-left sum value calculating portion 52 to the occupant determining threshold JD obtained from the threshold calculating portion 54. When the right-left sum value Wsum is larger than the occupant determining threshold JD, the occupant is determined as an adult, and when the right-left sum value Wsum is smaller than the occupant determining threshold JD, the occupant is determined as a child placed in a child seat that is fixed to the seat. The result of the occupant determination is used for controlling an operation of an air-bag in an accident.

Figure 4:
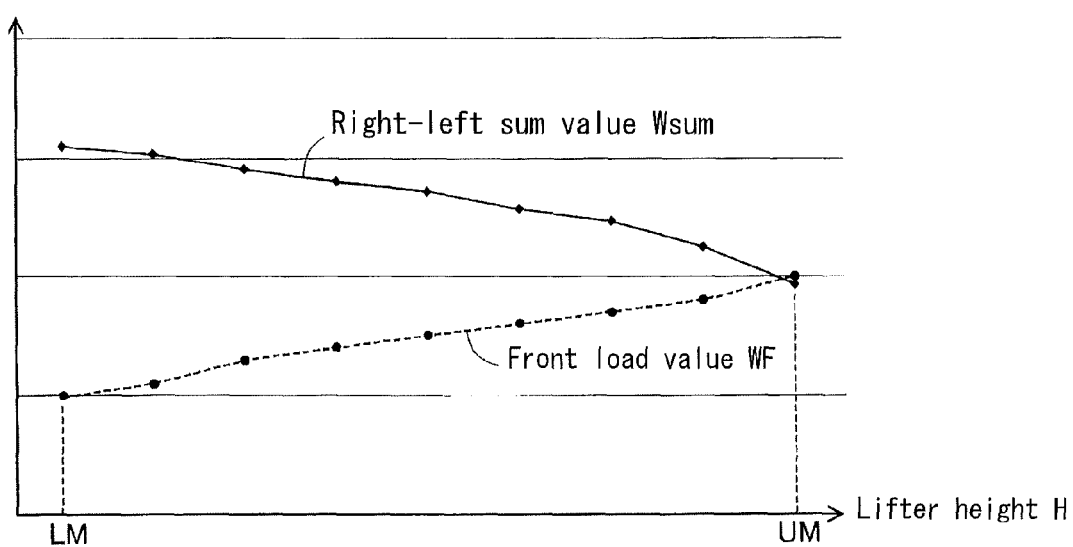
FIG. 4 illustrates a graph indicating observation results obtained by changing a lifter height in a state where a passenger whose weight is a minimum within a weight range to be determined as an adult in the first embodiment.

Next, preparing processes of the threshold calculation map 61 and the lifter height estimation map 62 are explained based on the observation results of FIG. 4. FIG. 4 is a graph of observation results of load values that changes as the lifter height H is changed. The observation results are obtained in a state where an occupant, whose weight is at a minimum level in a weight range that is to be determined as an adult occupant, is seated on the seat in a normal posture. In the graph of FIG. 4, a horizontal axis of the graph indicates the lifter height H, and the lower limit height LM is set at a left end of the horizontal axis, and the upper limit height UM is set at a right end of the horizontal axis. A vertical axis of the graph indicates actual load values obtained by the observation. As shown in the graph, the load values (the load values WL, WR and WF) are observed at nine degrees of lifter height H, the degrees being set in such a way that the lifter is gradually raised. A solid line in FIG. 4 indicates the change of the right-left sum value Wsum that is obtained by adding the rear left load value WL to the rear right load value WR, and a dashed line in FIG. 4 indicates the change of the front load value WF.

As shown in FIG. 4, the right-left sum value Wsum gradually decreases as the lifter height H is increased, and the front load value WF gradually increases as the lifter height H is increased. Accordingly, a front-to-rear ratio (f/r), which is obtained by dividing the front load value WF by the right-left sum value Wsum, monotonically increases as the lifter height H are gradually increased. This tendency may be established even when the occupant is replaced by other persons. Accordingly, the lifter height H may be estimated on the basis of detected load value WL, WR and WF in accordance with the lifter height estimation map 62 in which a relationship between the front-to-rear ratio (f/r) and the lifter height H is shown in a correspondence map format.

Further, the threshold calculation map 61 in the correspondence map format is obtained by replacing the right-left sum value Wsum in FIG. 4 by the occupant determining threshold JD. The threshold calculation map 61 indicates a relationship between the occupant determining threshold JD and the lifter height in the correspondence map format. On the basis of the threshold calculation map 61 in the correspondence map format, the occupant determining threshold JD relative to the set lifter height H may be obtained.

In a case where the vehicle is located on a slope so that the front portion of the vehicle is lowered further than the rear portion of the vehicle, some errors may be observed in the estimation of the lifter height H, however, because the relationship between the front-to-rear ratio (f/r) and the occupant determining threshold JD is maintained, the errors may not affect the accuracy of the seat occupant determination.

The lifter height H is an intermediate parameter used for obtaining the occupant determining threshold JD, which means an effect of both of the lifter height H and the vehicle tilt angle in some ways. In order to maintain the accuracy of the estimation of the lifter height H, an inclination sensor may be used to eliminate the affection of a tilt angle of the vehicle.

Furthermore, when the posture of the occupant changes, the detected load values WL, WR and WF may slightly change. For example, when the posture of the occupant changes, the right-left sum value Wsum may not follow the sold line in FIG. 4 and may fluctuate upwardly or downwardly, and the front load value WF may not follow the dotted line in FIG. 4 and may fluctuate upwardly or downwardly. Accordingly, the occupant determining threshold JD may be set so as to have a range.

According to the seat occupant determining apparatus 1 of the first embodiment, at the seat that includes the lifter 2 supporting the seat at four portions, the rear right and left load values WR and WL, detected at rear right and rear left portions of the seat to which over half of the occupant's load Wm is applied, are obtained, and the right-left sum value Wsum is calculated. Further, the front load value WF, detected at the front left portion of the seat to which less than half of the occupant's load Wm is applied, is obtained. On the basis of the detected values, the front-to-rear ratio (f/r) is calculated, and the lifter height H is estimated. Further, on the basis of the estimated lifter H, the occupant determining threshold JD is calculated. Because the seat occupant determining apparatus 1 of the first embodiment may consider the lifter height H and the vehicle tilt angle, the occupant determination may be established more accurately compared to a case where the total of three load values (WL+WR+WF) is only compared to the threshold.

Further, according to the first embodiment, the occupant determination is executed on the basis of the threshold calculation map 61 and the lifter height estimation map 62, each of which is prepared by arranging observation results of the load values WL, WR and WF. Accordingly, an accurate occupant determining threshold JD may be obtained, thereby contributing to the accurate occupant determination.

Further more, according to the first embodiment, the load detecting sensors 3F, 3L and 3R are provided at lower portions of the links 21FL, 21RL and 21RR, respectively, and no sensor is provided at the lower portion of the front right link 21FR. Compared to a known apparatus where four sensors are used, material costs and a manufacturing cost are lowered, and a total weight of the seat including the sensors may be decreased.

Figure 5:
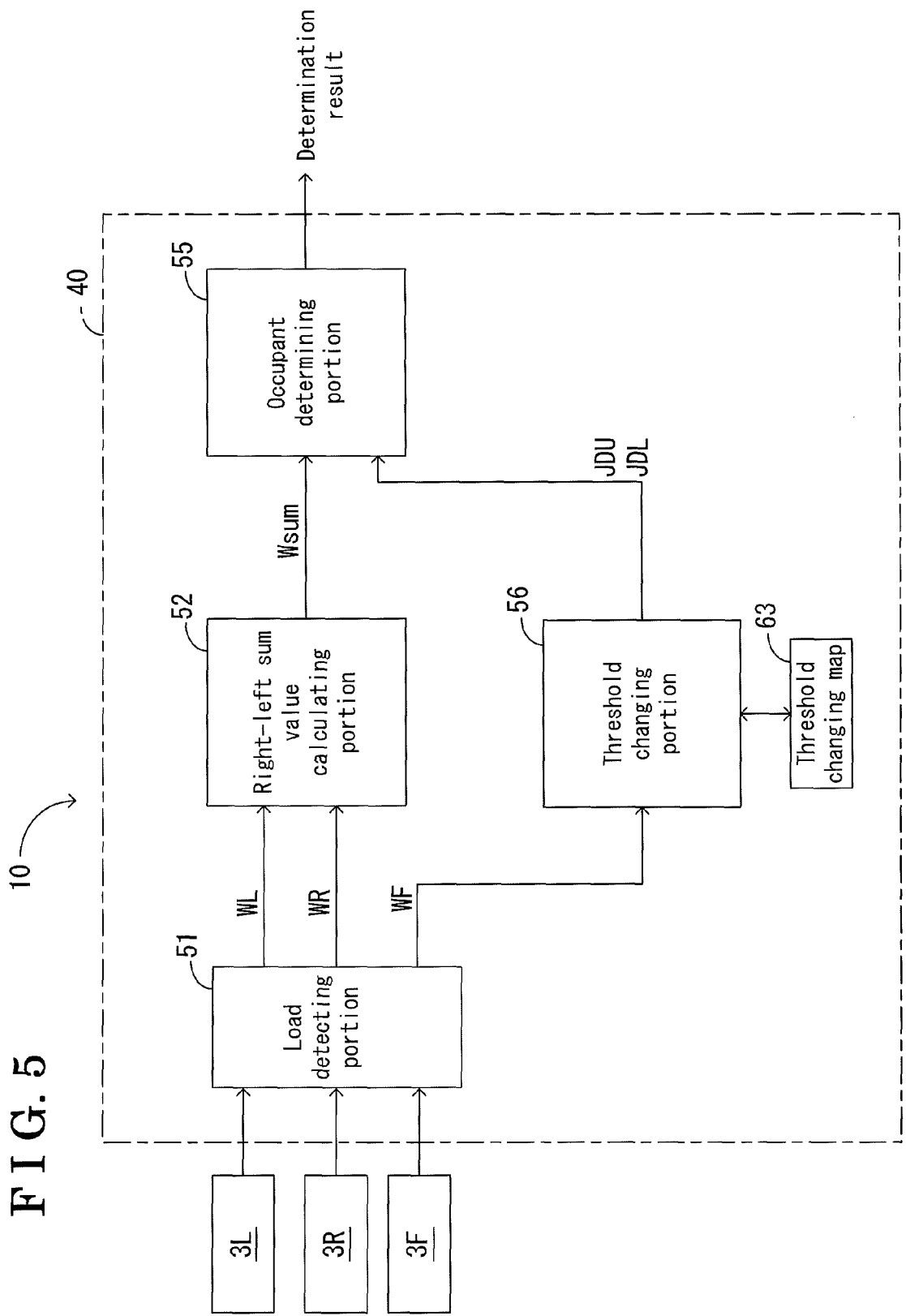
FIG. 5 illustrates a block diagram indicating a configuration of a seat occupant determining apparatus in a second embodiment.

Next, a seat occupant determining apparatus 10 of a second embodiment will be explained in accordance with FIGS. 5 and 6. Because the seat occupant determining apparatus 10 has a configuration basically similar to that of the seat occupant determining apparatus 1 of the first embodiment, only the differences will be emphasized in the following description. The seat occupant determining apparatus 10 may be applied to a seat with or without the lifter 2. Specifically, the configuration of an inner lower portion of a passenger seat to which the seat occupant determining apparatus 10 is applied is similar to the passenger seat shown in FIG. 1 to which the seat occupant determining apparatus 1 of the first embodiment is applied, however, the seat occupant determining apparatus 10 of the second embodiment may be applied to the passenger seat not having the lifter 2. FIG. 5 is a block diagram for explaining the configuration of the seat occupant determining apparatus 10 of the second embodiment. In the same manner as the first embodiment, the seat occupant determining apparatus 10 is configured mainly by the rear left load detecting sensor 3L, the rear right load detecting sensor 3R, the front load detecting sensor 3F and a load detection ECU 40, and software for the load detection ECU 40 is different from that of the load detection ECU 4 of the first embodiment.

The load detection ECU 40 is configured by a threshold changing map 63 and functional means such as the load detecting portion 51, the right-left sum value calculating portion 52, a threshold changing portion 56 and the occupant determining portion 55. The threshold changing portion 56 calculates an upper limit value JDU and a lower limit value JDL of an occupant determining threshold by matching the front load value WF obtained from the load detecting portion 51 to the threshold changing map 63. The threshold changing map 63 is data in which a relationship between the front load value WF and each of the upper limit value JDU and the lower limit value JDL of the occupant determining threshold is arranged in a correspondence map format. The threshold changing map 63 is prepared on the basis of observation results.

Figure 6:
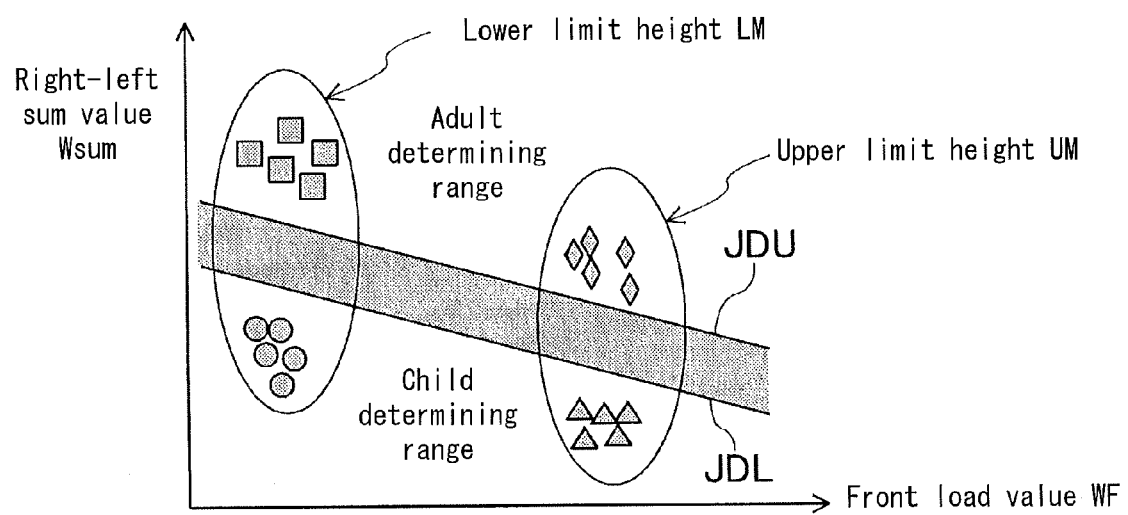
FIG. 6 illustrates a graph schematically indicating a threshold changing map in the second embodiment.

FIG. 6 is a graph for schematically explaining the threshold changing map 63 of the second embodiment. A horizontal axis of the graph indicates the front load value WF, and a vertical axis of the graph indicates the right-left sum value Wsum. On the graph, observation results, obtained in a case where an adult is sitting on the seat in various postures, are plotted. Square shaped marks indicate observation results of plural adults, each of them seated in terns on the seat whose lifter 2 is moved so as to reach the lower limit height LM, and diamond shaped marks indicate observation results of plural adults, each of them seated in terns on the seat whose lifter 2 is moved so as to reach the upper limit height UM. Similarly, observation results, obtained in a case where a child is placed in a child seat that is fixed to the seat, are plotted. Circle marks indicate observation results of children, each of them placed in turns on the child seat fixed to the seat whose lifter 2 is moved so as to reach the lower limit height LM, and triangle marks indicate observation results of children, each of them placed in terns on the child seat fixed to the seat whose lifter 2 is moved so as to reach the upper limit height UM.

As shown in FIG. 6, the right-left sum value Wsum of an adult is larger than that of a child, and the right-left sum value Wsum decreases as the front load value WF increases. On the basis of the abovementioned characteristic, an occupant determining threshold with a range may be set between the adult and the child in a manner where the threshold is set so as to extend in a right lower direction in FIG. 6 as the front load value WF increases.

In the threshold changing map 63, the occupant determining threshold with the range, regulated between the upper limit value JDU and the lower limit value JDL, relative to the front load value WF is arranged in a correspondence map format. An adult weight range is set above the upper limit value JDU, and a child weight range is set below the lower limit value JDL.

In this configuration, the occupant determining portion 55 compares the right-left sum value Wsum obtained from the right-left sum value calculating portion 52 to the upper limit value JDU and the lower limit value JDL of the range of the occupant determining threshold, each of the limit values obtained from the threshold changing portion 56. Then, when the right-left sum value Wsum is equal to or larger than the upper limit value JDU, the occupant determining portion 55 determines that an adult is sitting on the seat, and when the right-left sum value Wsum is smaller than the lower limit value JDL, the occupant determining portion 55 determines that a child is placed in the child seat that is fixed to the seat. When the right-left sum value Wsum is equal to or larger than the lower limit value JDL and is smaller than the upper limit value JDU, the occupant determining portion 55 suspends the occupant determination.

Thus, according to the seat occupant determining apparatus 10 of the second embodiment, regardless of the existence of the lifter 2, the upper limit value JDU and the lower limit value JDL of the range of the occupant determining threshold are calculated on the basis of the observation results of a plurality of adults and children who vary in weight and in sitting posture. Accordingly, the effect of the posture of the occupant may be reduced, thereby establishing the occupant determination with high accuracy.

Figure 7:
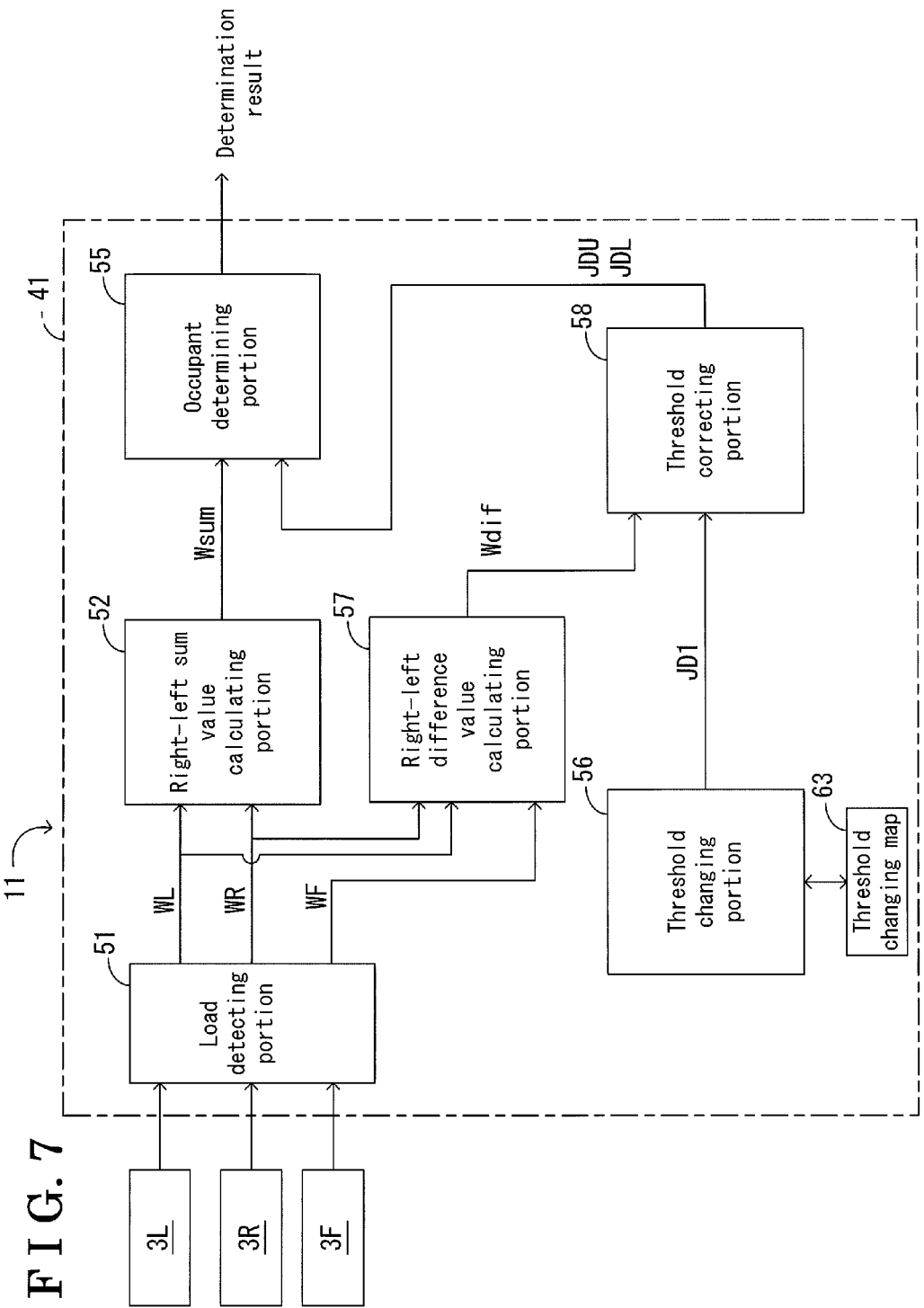
FIG. 7 illustrates a block diagram for explaining a configuration of a seat occupant determining apparatus in a third embodiment.
Figure 8:
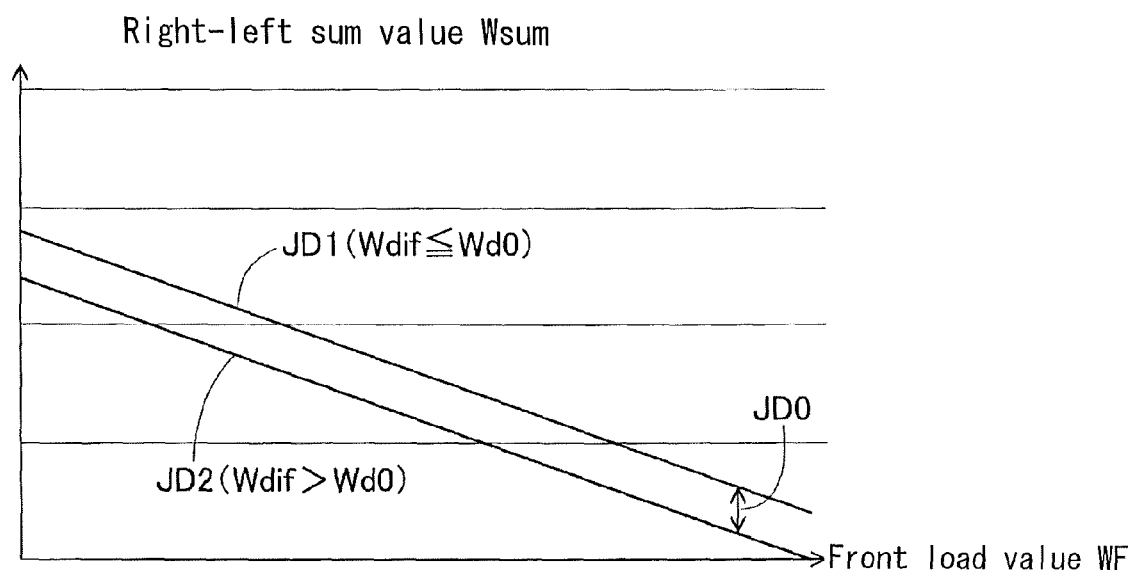
FIG. 8 illustrates a graph for explaining a function of a threshold correcting portion in the third embodiment.

Next, a seat occupant determining apparatus 11 of a third embodiment will be explained in accordance with FIGS. 7 and 8. Because the seat occupant determining apparatus 11 has a configuration basically similar to that of the seat occupant determining apparatus 1 of the first embodiment and the seat occupant determining apparatus 10 of the second embodiment, only the differences will be emphasized in the following description. The configuration of an inner lower portion of the passenger seat to which the seat occupant determining apparatus 11 is applied is similar to the passenger seat shown in FIG. 1 to which the seat occupant determining apparatus 1 of the first embodiment is applied, however, the seat occupant determining apparatus 11 of the third embodiment can decrease the effect of the sitting posture where the occupant sits toward the right or sits toward the left. FIG. 7 is a block diagram for explaining the configuration of the seat occupant determining apparatus 11 of the third embodiment. In the same manner as the first and second embodiments, the seat occupant determining apparatus 11 is configured mainly by the rear left load detecting sensor 3L, the rear right load detecting sensor 3R, the front load detecting sensor 3F and a load detection ECU 41, and software for the load detection ECU 41 is different from the load detection ECU 4 of the first embodiment and the load detection ECU 40 of the second embodiment.

The load detection ECU 41 is configured by the threshold changing map 63 and functional means such as the load detecting portion 51, the right-left sum value calculating portion 52, the threshold changing portion 56, a right-left difference value calculating portion 57, a threshold correcting portion 58 and the occupant determining portion 55. The right-left difference value calculating portion 57 calculates a right-left difference value Wdif that is an absolute value of a difference obtained by subtracting the rear right load value WR from the rear left load value WL, which are obtained from the load detecting portion 51. The right-left difference value Wdif is used as an indicator so as to be compared to a predetermined value Wf0 in order to determine whether or not the occupant is sitting to the right or the left. The threshold changing portion 56 calculates a normal occupant determining threshold JD1 used for a normal situation on the basis of the threshold changing map 63 prepared by using observed values in the same manner as the second embodiment. The normal occupant determining threshold JD1 is a single value not having a range. For example, the normal occupant determining threshold JD1 is set as an intermediate value between the upper limit value JDU and the lower limit value JDL of the second embodiment.

The threshold correcting portion 58 passes the normal occupant determining threshold JD1 obtained from the threshold changing portion 56 to the occupant determining portion 55 in the normal situation where the right-left difference value Wdif obtained from the right-left difference value calculating portion 57 does not exceed the predetermined value Wd0. The threshold correcting portion 58 also calculates a corrected occupant determining threshold JD2 obtained by subtracting the predetermined amount JD0 from the normal occupant determining threshold JD1(JD2=JD1−JD0) in a case where the right-left difference value Wdif exceeds the predetermined value Wd0. FIG. 8 is a graph for explaining a function of the threshold correcting portion 58 of the third embodiment. A horizontal axis of the graph indicates the front load value WF, and a vertical axis of the graph indicates the right-left sum value Wsum. As indicated in the graph, the normal occupant determining threshold JD1 has a characteristic that is identical to the range of the occupant determining threshold of the second embodiment shown in FIG. 6, where the threshold is set so as to extend in a right lower direction as the front load value WF increases. The corrected occupant determining threshold JD2 is set so as to be parallel to the normal occupant determining threshold JD1 by the predetermined amount JD0 below thereto.

The occupant determining portion 55 compares the right-left sum value Wsum obtained from the right-left sum value calculating portion 52 to the normal occupant determining threshold JD1 obtained from the threshold changing portion 56 or the corrected occupant determining threshold JD2 in order to determine the occupant as an adult or a child.

According to the seat occupant determining apparatus 11 of the third embodiment, the threshold correcting portion 58 calculates the corrected occupant determining threshold JD2 by subtracting the predetermined amount JD0 from the occupant determining threshold JD1 in a case where the right-left difference value Wdif exceeds the predetermined value Wd0. Thus, the posture of the occupant sitting to the right or the left of the seat may be detected, and the occupant determining threshold may be corrected (e.g., reduced) in the light of a load that escapes to a portion other than the seat, for example escapes to an inner panel of a door of the vehicle (JD1→JD2). Thus, in a case where the occupant sits on the seat to the right or the left of the seat, even when the right-left sum value is obtained in a decreasing manner, the seat occupant determination may be executed with high accuracy.

The configuration of the inner lower portion of the seat in each embodiment is set as illustrated in FIG. 1, however, the configuration of the seat is not limited to the illustrated configuration. The seat occupant determining apparatus is applied to the seat, regardless of the existence of the lifter or the slide mechanism, and regardless of the number of the supporting portions (not limited to the four supporting portions). Further, in the embodiments two load detecting sensors are provided at the rear portion of the seat and one load detecting sensor is provided at the front portion of the seat, however, two load detecting sensors may be provided at the front portion of the seat and one load detecting sensor may be provided at the rear portion of the seat. In the first embodiment, the threshold calculation map 61 and the lifter height estimation map 62 are used, and in the second embodiment, threshold changing map 63 is used, however, those maps may be replaced by a threshold changing function formula. The threshold changing function formula is a function formula expressing the occupant determining threshold JD by use of the front load value WF or the lifter height H.

The seat occupant determining apparatus in this disclosure determines an occupant of the seat to be an adult or a child by comparing the right-left sum value, calculated by adding the first load value to the second load value, to the occupant determining threshold that may change so as to correspond to the third load value. A ratio of each of the first, second and third load values in the occupant's load acting on the seat may change depending on the seating posture of the occupant and the vehicle tilt angle. For example, when the occupant is sitting on the seat in a manner where a position of a center of the occupant is displaced to the third load detecting sensor, a ratio of the third load value in the occupant's load is larger than that in a normal posture, and a ratio of the load values, detected by the first and second load detecting sensors, which are distant from the position of the center of the occupant in the occupant's load, and a ratio of the right-left sum value in the occupant's load, are smaller than that in the normal posture. On the other hand, when the position of the center of the occupant is distant from the third detecting sensor, a ratio of the third load value in the occupant's load is small, and a ratio of the right-left sum value in the occupant's load is large.

The occupant determining threshold is changed on basis of the abovementioned characteristics. From a qualitative standpoint, the larger the third load value is, the smaller the occupant determining threshold is set. In other words, when the third load value is large, the position of the enter of the occupant is assumed to be close to the third load detecting sensor, and the occupant is determined as an adult, even when the right-left sum value is small. When an adult whose weight is relatively heavy sits on the seat in a normal seating posture, the third load value is large, and the right-left sum value is also large. Accordingly, the determination of a heavy weight adult is executed correctly on the basis of a small occupant determining threshold. Further, because the same can be said for the case where the position of the center of the occupant is changed due to the vehicle tilt angle, the occupant determination is executed with high accuracy by reducing the effect of the seating posture of the occupant and the effect of the vehicle tilt angle. Thus, because the seat occupant determining apparatus in this disclosure considers the seating posture of the occupant and the vehicle tilt angle, the occupant determination may be established more accurately compared to a case where the total of three load values (WL+WR+WF) is only compared to the threshold.

Furthermore, according to the first embodiment, three load detecting sensors are provided at three of four supporting portions. Compared to a known apparatus where four sensors are used, material costs and a manufacturing cost can be lowered, and a total weight of the seat including the sensors can be decreased.

The seat occupant determining apparatus of this disclosure is appropriate for a widely prevalent seat that is supported by the vehicle at four supporting portions. Further, when the adult is sitting on the seat in the normal sitting posture, the rear right and left load values, detected at rear right and rear left portions of the seat to which over half of the occupant's load is applied, are obtained, and the front load value, detected at the front left portion of the seat to which less than half of the occupant's load is applied, is obtained. Thus, the right-left sum value, serving as a main indicator, is obtained on the basis of the over half of the occupant's load, and the occupant determining threshold is changed on the basis of the third load value, accordingly the occupant determination is executed with high accuracy.

According to this disclosure, the occupant determining threshold is obtained from the observation result, which means the occupant determining threshold is accurate by which contributing an accurate occupant determination. Further, the occupant determining threshold is prepared in a form of the threshold changing map or the threshold changing function formula, which may be used rapidly and easily.

The seat occupant determining apparatus of this disclosure is appropriate for a seat having a lifter. The seat occupant determining apparatus estimate a lifter height on the basis of the first, second and third load values and calculates the occupant determining threshold on the basis of an estimated lifter height. Accordingly, the occupant determination may be executed with high accuracy by reducing an effect of the lifter height.

According to the seat occupant determining apparatus of this disclosure, when the occupant is in a posture where the occupant leans to the right or left, for example the occupant leans on an inner panel of the vehicle, a part of the occupant's load escapes to, for example, the vehicle body, thereby reducing the right-left sum value. At this point, the leaned posture of the occupant is determined by calculating the right-left difference value, and the occupant determining threshold may be corrected (reduced) in the light of the reduced load. Accordingly, even when the right-left sum value is reduced due to the leaned posture of the occupant, the occupant determination may be executed with high accuracy.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat occupant determining apparatus of a seat adapted to a vehicle, comprising:
a first load detecting sensor provided at a right portion of the seat in a seat width direction and at a lower portion of the seat in a seat height direction in order to detect a part of a load acting on the seat and a second load detecting sensor provided at a left portion of the seat in the seat width direction and at a lower portion of the seat in the seat height direction in order to detect a part of the load acting on the seat, where the seat has a seat back and the seat width direction corresponds to a width direction of the seat back;
a third load detecting sensor provided so as to be distant from the first and second load detecting sensors in a front or a rear direction of the seat in order to detect a part of the load acting on the seat;
a right-left sum value calculating portion calculating a right-left sum value by adding a first load value detected by the first load detecting sensor and a second load value detected by the second load detecting sensor;
a threshold changing portion for changing an occupant determining threshold on the basis of a third load value detected by the third load detecting sensor; and
an occupant determining portion determining an occupant of the seat to be an adult when the right-left sum value is equal to or more than the occupant determining threshold and determining an occupant of the seat to be a child placed in a child seat that is fixed to the seat when the right-left sum value is less than the occupant determining threshold.

2. A seat occupant determining apparatus according to claim 1, wherein the seat is supported by the vehicle at first, second, third and fourth supporting portions, where the first load detecting sensor is arranged at the first supporting portion at a rear right portion of the seat, the second load detecting sensor is arranged at the second supporting portion at a rear left portion of the seat, and the third load detecting sensor is arranged at the third supporting portion at a front right portion of the seat or the fourth supporting portion at a front left portion of the seat.

3. A seat occupant determining apparatus according to claim 1, wherein the threshold changing portion includes an occupant determining threshold in a form of a threshold changing map or a threshold changing function formula, the occupant determining threshold being calculated on the basis of observation results of the first load value, the second load value and the third load value being obtained under conditions where a load of an adult or a child is acted to the seat.

4. A seat occupant determining apparatus according to claim 2, wherein the threshold changing portion includes an occupant determining threshold in a form of a threshold changing map or a threshold changing function formula, the occupant determining threshold being calculated on the basis of observation results of the first load value, the second load value and the third load value being obtained under conditions where a load of an adult or a child is acted to the seat.

5. A seat occupant determining apparatus according to claim 1, wherein the seat includes a lifter for raising and lowering a seating surface of the seat, where the first, second and third load detecting sensors are arranged below the lifter, and the threshold changing portion includes a lifter height estimating portion for estimating a lifter height on the basis of a relative relationship between the first and second load values and the third load value and a threshold calculating portion for calculating the occupant determining threshold on the basis of the estimated lifter height.

6. A seat occupant determining apparatus according to claim 2, wherein the seat includes a lifter for raising and lowering a seating surface of the seat, where the first, second and third load detecting sensors are arranged below the lifter, and the threshold changing portion includes a lifter height estimating portion for estimating a lifter height on the basis of a relative relationship between the first and second load values and the third load value and a threshold calculating portion for calculating the occupant determining threshold on the basis of the estimated lifter height.

7. A seat occupant determining apparatus according to claim 3, wherein the seat includes a lifter for raising and lowering a seating surface of the seat, where the first, second and third load detecting sensors are arranged below the lifter, and the threshold changing portion includes a lifter height estimating portion for estimating a lifter height on the basis of a relative relationship between the first and second load values and the third load value and a threshold calculating portion for calculating the occupant determining threshold on the basis of the estimated lifter height.

8. A seat occupant determining apparatus according to claim 5, wherein the lifter height estimating portion estimates the lifter height on the basis of a front-to-rear ratio indicating a ratio between the third load value and the right-left sum value.

9. A seat occupant determining apparatus according to claim 6, wherein the lifter height estimating portion estimates the lifter height on the basis of a front-to-rear ratio indicating a ratio between the third load value and the right-left sum value.

10. A seat occupant determining apparatus according to claim 7, wherein the lifter height estimating portion estimates the lifter height on the basis of a front-to-rear ratio indicating a ratio between the third load value and the right-left sum value.

11. A seat occupant determining apparatus according to claim 1 further comprising a right-left difference value calculating portion for calculating right-left difference value by calculating a difference between the first load value and the second load value and a threshold correcting portion for correcting the occupant determining threshold, obtained from the threshold changing portion, on the basis of the calculated right-left difference value.

12. A seat occupant determining apparatus according to claim 2 further comprising a right-left difference value calculating portion for calculating right-left difference value by calculating a difference between the first load value and the second load value and a threshold correcting portion for correcting the occupant determining threshold, obtained from the threshold changing portion, on the basis of the calculated right-left difference value.

13. A seat occupant determining apparatus according to claim 3 further comprising a right-left difference value calculating portion for calculating right-left difference value by calculating a difference between the first load value and the second load value and a threshold correcting portion for correcting the occupant determining threshold, obtained from the threshold changing portion, on the basis of the calculated right-left difference value.

14. A seat occupant determining apparatus according to claim 5 further comprising a right-left difference value calculating portion for calculating right-left difference value by calculating a difference between the first load value and the second load value and a threshold correcting portion for correcting the occupant determining threshold, obtained from the threshold changing portion, on the basis of the calculated right-left difference value.

15. A seat occupant determining apparatus according to claim 8 further comprising a right-left difference value calculating portion for calculating right-left difference value by calculating a difference between the first load value and the second load value and a threshold correcting portion for correcting the occupant determining threshold, obtained from the threshold changing portion, on the basis of the calculated right-left difference value.

16. A seat occupant determining apparatus according to claim 11, wherein the threshold correcting portion reduces the occupant determining threshold when the right-left difference value exceeds a predetermined value.

17. A seat occupant determining apparatus according to claim 12, wherein the threshold correcting portion reduces the occupant determining threshold when the right-left difference value exceeds a predetermined value.

18. A seat occupant determining apparatus according to claim 13, wherein the threshold correcting portion reduces the occupant determining threshold when the right-left difference value exceeds a predetermined value.

19. A seat occupant determining apparatus according to claim 14, wherein the threshold correcting portion reduces the occupant determining threshold when the right-left difference value exceeds a predetermined value.

20. A seat occupant determining apparatus according to claim 15, wherein the threshold correcting portion reduces the occupant determining threshold when the right-left difference value exceeds a predetermined value.

* * * * *